US009474967B2

(12) United States Patent
Bojorquez et al.

(10) Patent No.: US 9,474,967 B2
(45) Date of Patent: Oct. 25, 2016

(54) INTERNET DISTANCE-BASED MATCHMAKING

(71) Applicant: Activision Publishing, Inc., Santa Monica, CA (US)

(72) Inventors: John Bojorquez, Santa Monica, CA (US); Paul Kerby, Santa Monica, CA (US); Jeff Curley, Santa Monica, CA (US)

(73) Assignee: Activision Publishing, Inc., Santa Monica, CA (US)

( * ) Notice: Subject to any disclaimer, the term of this patent is extended or adjusted under 35 U.S.C. 154(b) by 265 days.

(21) Appl. No.: 13/958,471

(22) Filed: Aug. 2, 2013

(65) Prior Publication Data

US 2015/0038234 A1     Feb. 5, 2015

(51) Int. Cl.
| A63F 13/30 | (2014.01) |
| A63F 13/352 | (2014.01) |
| A63F 13/795 | (2014.01) |
| A63F 13/358 | (2014.01) |

(52) U.S. Cl.
CPC ........... *A63F 13/352* (2014.09); *A63F 13/358* (2014.09); *A63F 13/795* (2014.09)

(58) Field of Classification Search
CPC .................................. A63F 13/12; H04L 29/08
See application file for complete search history.

(56) References Cited

U.S. PATENT DOCUMENTS

| 6,012,096 A * | 1/2000 | Link ....................... H04L 12/24 |
| | | 709/233 |
| 6,038,599 A * | 3/2000 | Black .................. H04L 12/2602 |
| | | 709/223 |
| 6,542,468 B1 * | 4/2003 | Hatakeyama ....... H04L 63/0281 |
| | | 370/238 |
| 8,144,611 B2 * | 3/2012 | Agarwal et al. .............. 370/252 |
| 8,998,726 B1 * | 4/2015 | Wakeford ............. A63F 13/795 |
| | | 463/42 |
| 2002/0143918 A1 * | 10/2002 | Soles ...................... H04L 29/06 |
| | | 709/223 |
| 2004/0116186 A1 * | 6/2004 | Shim ....................... A63F 13/12 |
| | | 463/42 |
| 2004/0215756 A1 * | 10/2004 | VanAntwerp ........... A63F 13/12 |
| | | 709/223 |
| 2010/0056275 A1 * | 3/2010 | Wilson et al. ................... 463/32 |
| 2010/0197405 A1 * | 8/2010 | Douceur et al. ................ 463/42 |
| 2012/0059783 A1 * | 3/2012 | Fiedler ............................ 706/46 |
| 2013/0262203 A1 * | 10/2013 | Frederick et al. .......... 705/14.12 |
| 2014/0189091 A1 * | 7/2014 | Tamasi et al. ................ 709/224 |

FOREIGN PATENT DOCUMENTS

EP                1471710 A2 * 10/2004 ............. H04L 29/08

OTHER PUBLICATIONS

"Measurement and Estimation of Network QoS among Peer Xbox 360 Game Players" written by Youngki Lee et al., published Apr. 2008, accessible and printed from URL <http://ink.library.smu.edu.sg/cgi/viewcontent.cgi?article=3078&context=sis_research>, 11 pages.*
"An Architecture for a Global Internet Host Distance Estimation" written by Paul Francis et al., Proceedings of IEEE INFOCOM '99, New York, NY, Mar. 1999, 17 pages.*
Huffaker et al. "Distance Metrics in the Internet", Proc. of IEEE International Telecommunications Symposium (ITS), 2002, p. 200-202.
Sivasubramanian et al. "Replication for Web Hosting Systems", ACM Computing Surveys, vol. 36, No. 3, Sep. 2004, pp. 291-334.

* cited by examiner

*Primary Examiner* — Jason Skaarup
(74) *Attorney, Agent, or Firm* — Klein, O'Neill & Singh, LLP

(57) ABSTRACT

The present invention provides a method for online multi-player matchmaking in which the interne distance between a user and potential game hosts is determined.

13 Claims, 7 Drawing Sheets

INTERNET DISTANCE-BASED MATCHMAKING

BACKGROUND OF THE INVENTION

The present invention relates generally computer networking methods and systems, and more particularly, to matchmaking methods and systems for use in online multiplayer video games.

Recent advances in computer technology and computer networking have resulted in a proliferation of network-based applications, including online video games, voice over IP (VoIP) telephony, online file and data sharing, online media streaming, and many others. In network-based applications, network connection quality may be an important factor in determining the overall quality of the user's experience. For example, many modern video games provide for online multiplayer gameplay in which multiple players can participate in a game over a network. In some architectures, the users communicate with dedicated, centralized servers that host and coordinate the games. In other architectures, users may host games and act as both server and one of the clients. Regardless of what architecture is adopted, it is preferable to have adequate network connection quality between users and hosts.

The network connection quality between a user and a host can be approximated using one or more network characteristics including, for example, the round trip time (RTT) of sending and receiving packets, one-way measurements of latency, bandwidth and/or throughput measurements, and other quality of service metrics. If the network connection quality between a user and host is poor, the network latency may manifest itself as perceivable delays in gameplay, or lag. Network connection quality depends on a variety of factors, including network bandwidth, network congestion, the number of communication hops between the user and the host, and the capabilities of the user and host computers.

Reliably determining or predicting the network connection quality between the user and available host computers may be difficult. A brute force technique is to test the network connection quality of every available host, but this approach may be impractical as there may be thousands (or millions) of available hosts, and the time required to test the connection quality for every host could be prohibitive.

Another known technique relies on the approximated geographic distance between the user and the available hosts as a predictor for determining network connection quality. In practice, however, using geographical distance as a proxy for network connection quality may be unreliable. For example, conventional geo-location services may not accurately report a user's geo-location. In most instances, a computer's IP address can only be used to look up the physical address of the registrant of the IP address (e.g., an Internet Service Provider's physical address as opposed to the user's physical address). But the registrant of the IP address often has a physical address that is different and distant from the user's physical address. In other instances, a computer's geo-location is approximated using information retrieved from the computer itself, such as its computer's time zone and language. But the information retrieved from the computer is generally determined by the user and is thus subject to manipulation.

Also, even assuming the user and host computers' geo-locations could be reliably ascertained, the geographic distance between the two computers may still fail to provide a strong correlation to the internet distance (or number of network hops or transit path length) between the user and the host. This is because the geographic distance between two computers may fail to take into account the complex topology of the internet and its routing architecture.

SUMMARY OF THE INVENTION

One aspect of the invention provides a method for online multiplayer matchmaking comprising: determining at least one selected game characteristic; determining at least one host of a game matching the selected game characteristic; determining the internet distance between a user and the host; wherein determining the internet distance between the user and the host comprises determining the user's autonomous system and the host's autonomous system.

In another aspect of the invention, determining the internet distance between the user and the host further comprises determining whether the user's autonomous system is the same as the host's autonomous system.

In another aspect of the invention, determining the internet distance between the user and the host further comprises determining whether the user's autonomous system and the host's autonomous system are neighboring autonomous systems.

In another aspect of the invention, determining the internet distance between the user and the host further comprises determining a quality of service metric for data sent between a plurality of computers in the user's autonomous system and a plurality of computers in the host's autonomous system, wherein the quality of service metric is determined by one or more of: latency for packets sent between a plurality of computers in the two autonomous systems, network jitter (or packet delay variation) for packets sent between a plurality of computers in the two autonomous systems, rate of packet loss for packets sent between a plurality of computers in the two autonomous systems, and the availability of a plurality of computers in the two autonomous systems.

In another aspect of the invention, determining the internet distance between the user and the host further comprises determining the number of autonomous systems that must be traversed to send a packet from the user's autonomous system to the host's autonomous system.

Another aspect of the invention provides a computer implemented method for determining a plurality of potential hosts for a multiplayer video gaming session, comprising: receiving, over a network, an indication from a plurality of game systems that the game systems are available as a host for a multiplayer video gaming session, along with, for each of the plurality of game systems, a plurality of game characteristics for the multiplayer video gaming session, the plurality of game characteristics including characteristics of a video game for the multiplayer video gaming session and at least one characteristic, represented by a numerical value, associated with a user of the game system; receiving, over the network, a request from a further game system for available multiplayer video gaming sessions, the request including at least one characteristic of a requested video game for the multiplayer video gaming session and at least one characteristic, represented by a numerical value, associated with a user of the further game system; determining potential multiplayer video gaming session hosts, by determining which of the game systems available as a host have characteristics of the video game the same as characteristics of the requested video game for the multiplayer video gaming session, have the characteristic associated with the user of the game system within a predefined numerical set of the characteristic of the user of the further game system, and which are in a predefined set of autonomous systems as the further game system; transmitting a request to the further game system to test a network connection quality between the further game system and at least some of the game systems determined to be potential multiplayer video gaming session hosts; receiving an indication from the further game system of the network connection quality between the further game system and the at least some of the game systems determined to be potential multiplayer video gaming session hosts; selecting as possible multiplayer video gaming session hosts those game systems having a network connection quality with the further game system better than a predefined network connection quality; and transmitting, to the further game system, information of the game systems which are possible multiplayer video gaming session hosts.

Another aspect of the invention provides a method for online multiplayer matchmaking comprising: determining at least one selected game characteristic; determining at least one host of a game matching the selected game characteristic; determining the internet distance between a user and the host; wherein determining the internet distance between the user and the host comprises determining the user's autonomous system and the host's autonomous system.

Another aspect of the invention provides a system for performing matchmaking for multiplayer video game play, comprising: a server system coupled to the Internet, the server system including one or more processors configured by program instructions to execute at least a matchmaking module and a data collection module; electronic storage storing information regarding video games available for multiplayer game play and user profile information, the user profile information including an indication of skill of users and game characteristics of the users; the data collection module including program instructions to determine an indication of internet distance between game machines of users and potential multiplayer video game host machines, the indication of internet distance being based on autonomous system information of the game machines of the users and of the potential multiplayer video game host machines and network latency statistics between game machines in a same and different autonomous systems; the matchmaking module including program instructions to match game machines of users with potential multiplayer video game player host machines based on the indication of skill of the users, the game characteristics of the users, and the indication of internet distance between the game machines of users and the potential multiplayer video game host machines.

These and other aspects of the invention are more fully comprehended upon review of this disclosure.

DETAILED DESCRIPTION

Figure 1:
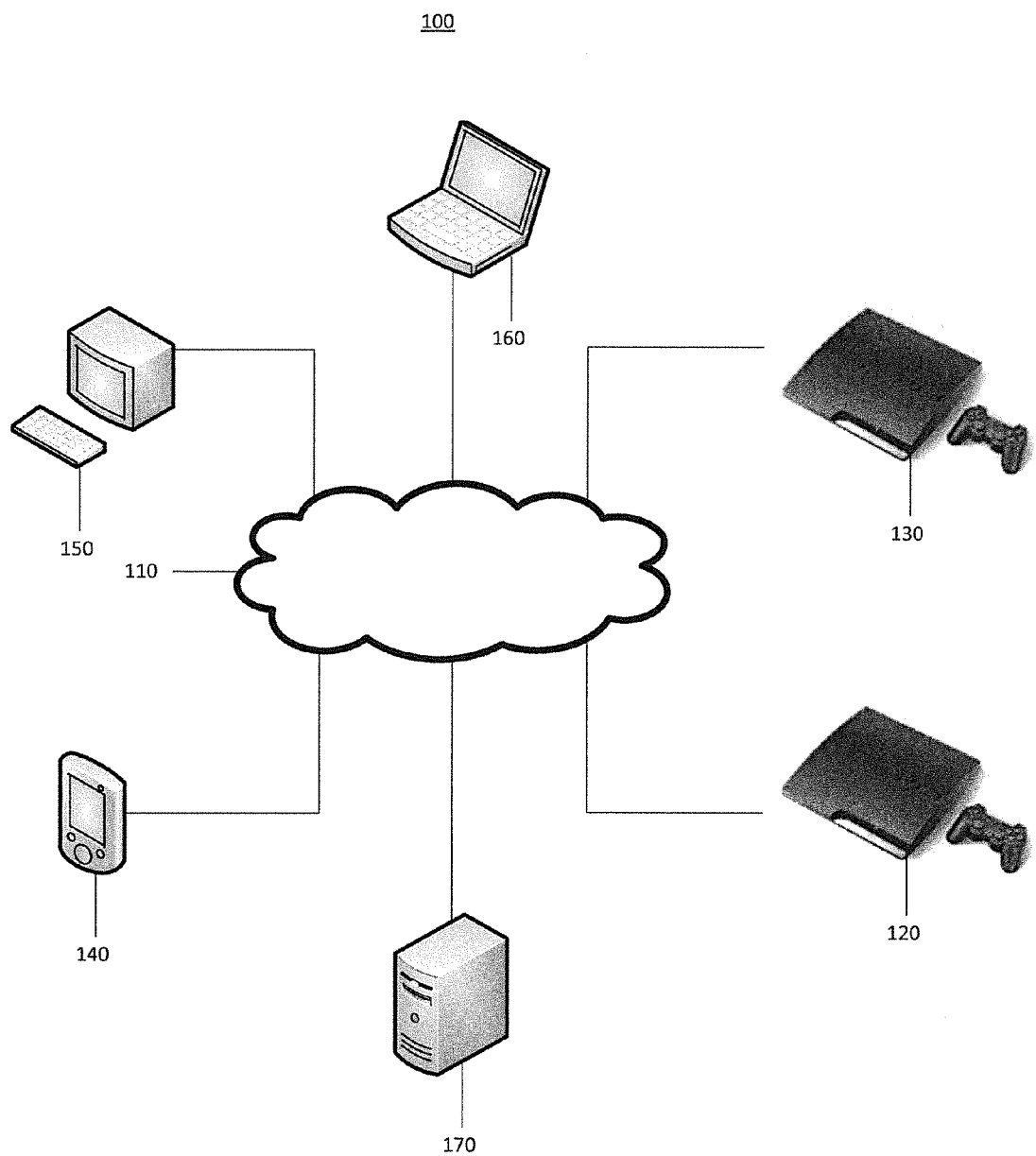
FIG. 1 is a block diagram illustrating an example of a video game system in accordance with aspects of the present invention.

FIG. 1 is a block diagram illustrating an exemplary system 100 in accordance with aspects of the present invention. System 100 improves online multiplayer matchmaking by providing improved predictions of network latency and network connection quality between a user of an online multiplayer game and hosts of the online multiplayer game. System 100 includes a communication network 110, which may be the interne, for example. System 100 also includes user computers 120-160 and a matchmaking server 170. User computers 120-160 may comprise various compute devices suitable for executing video games and communicating over communication network 110. In this example, system 100 comprises a first game console 120 and a second game console 130, each with associated monitor and game controller. In addition to the game consoles, user computers may comprise any other suitable compute devices such as smartphone 140, desktop computer 150, and laptop computer 160. The user computers 120-160 each have one or more processors, memory, communication circuitry, and associated hardware. User computers 120-160 may communicate with other user computers 120-160 by sending and receiving data through communication network 110. Of course, the number of devices shown in FIG. 1 is merely exemplary, and in many embodiments, many more devices may be present.

Using a user computer 120-160, a user seeking to join a game can connect to the matchmaking server 170 through the communication network 110. Once connected to the matchmaking server 170, the user can request a list of games matching one or more selected game characteristics. Examples of selectable game characteristics may include game mode or game type, level or map difficulty, maximum or minimum skill or experience level of other users, preferred game maps, preferred playing partners, gameplay rules, and/or any other characteristics of the desired game. It should be appreciated that the selectable game characteristics may differ from embodiment to embodiment depending on the specific genre and implementation of the game. For example, a first-person shooter game may have different selectable game characteristics than a real-time strategy game or a sports game. In some embodiments, the user's preferred game characteristics may be saved in a user profile, and automatically loaded as default selections.

In some embodiments, the user may select from one or more playlists, which reflect predefined configurations of game characteristics. For example, in a first-person shooter game, playlists may be based on the game mode or game type, and may, for example, include Team Deathmatch (multiple teams competing to vanquish the most opposing teams' members or be the first to vanquish a certain number of opposing teams' members), Capture the Flag (multiple teams competing to capture the opposing teams' flag(s)), Free for All (individual players competing to vanquish the most opponents or be the first to vanquish a certain number of opponents), Kill Confirmed (multiple teams competing to earn points by vanquishing and collecting items from opposing teams' members), and Search & Destroy (multiple teams take turns attempting to achieve a certain objective, for example, deploying a bomb in the other team's base). Of course, these examples of playlists are merely exemplary, and any number of game characteristics can be used to craft a playlist. For example, a playlist may comprise games in which only small maps are used, or games in which only novice players may join. In an online basketball game, playlists may be based on the duration of the basketball game (e.g., two minute quarters, five minute quarters, or fifteen minute quarters) or the number of players per team (e.g., two-on-two or five-on-five). In some embodiments, the user may define his or her own playlists.

After the desired game characteristics are been selected, the matchmaking server 170 determines available hosts of games matching the selected characteristics. The details of this process are described in more detail below. The matchmaking server 170 then returns a list of available hosts of games matching the selected characteristics. Alternatively, in some embodiments, instead of returning a list of available games, the matchmaking server may automatically match the user with one of the available hosts.

System 100 generally comprises a pool of user computers for users seeking to join a game and a pool of potential hosts for the game. In some embodiments, system 100 is generally configured such that user computers 120-160 can comprise both users seeking to join an online multiplayer game and users hosting an online multiplayer game. Additionally or alternatively, however, system 100 may be configured such that user computers 120-160 are clients seeking to join games hosted by dedicated game servers. The dedicated game servers may perform functions related to video game play amongst users of the user computers 120-160. In some embodiments, the server may distribute and coordinate game state and/or action information received from the user computers to allow for coordinated game play amongst multiple users. And in some embodiments, the dedicated game servers may also determine game states based on information received from the user computers regarding actions taken during game play. In some embodiments, the dedicated game servers may be integrated with matchmaking server 170. However, in some embodiments, the functionality of the dedicated game servers and/or matchmaking server 170 may be performed by user computers 120-160.

During game play the user computers 120-160 execute program instructions to provide for play of the video game. Video game users provide game play inputs using their respective input devices, for example game controllers, keyboards, mice, etc., and the associated displays and monitors display game play events. As suggested above, the present matchmaking invention may be applied to virtually any genre of online multiplayer video game, including action/adventure games, fighting games, first-person shooter games, real-time strategy games, role playing games, sporting games, or vehicle simulator games.

Figure 2:
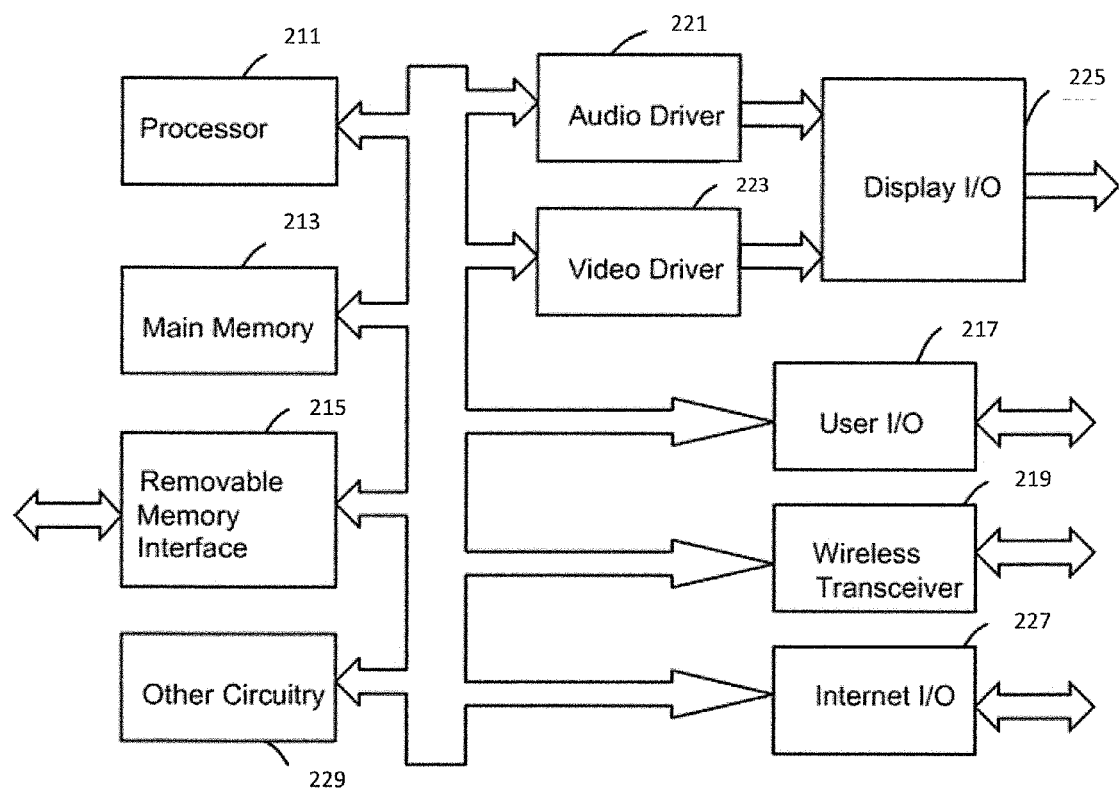
FIG. 2 is a block diagram showing a processor and associated circuitry useful in accordance with aspects of the invention.

FIG. 2 is an example of a block diagram of a user computer's processor and associated circuitry useful in accordance with aspects of the invention. As shown in FIG. 2, a processor 211 is connected to other components via a bus. The other components include a main memory 213 and a removable memory interface 215, generally coupled to a removable memory device, for example, a CD-ROM, DVD-ROM, or Blu-ray disc drive. The processor may execute instructions retrieved from the removable memory device to control game play and store game state information in the main memory. For example, the instructions may be for determining possible movements, positions, and locations of a game character.

The processor is coupled to an audio driver 221 and a video driver 223. The audio driver produces sound signals and the video driver produces image signals. The sound signals and image signals are transmitted from the game console via a display I/O device 225. The display I/O device generally supplies the sound and image signals to a display device external to the game console.

The processor may also be coupled to a user I/O device 217, a wireless transceiver 219, an Internet I/O device 227, and other circuitry 229. The user I/O device may receive signals from a peripheral device and/or signals from a keyboard, a mouse, and/or a game controller, with generally the keyboard, mouse, and/or controller being used by a user and providing user inputs, for example, during game play. Alternatively or additionally, the game console may receive user inputs via the wireless transceiver. The Internet I/O device provides a communication channel that may be used, for example, for multiple player games.

Figure 3:
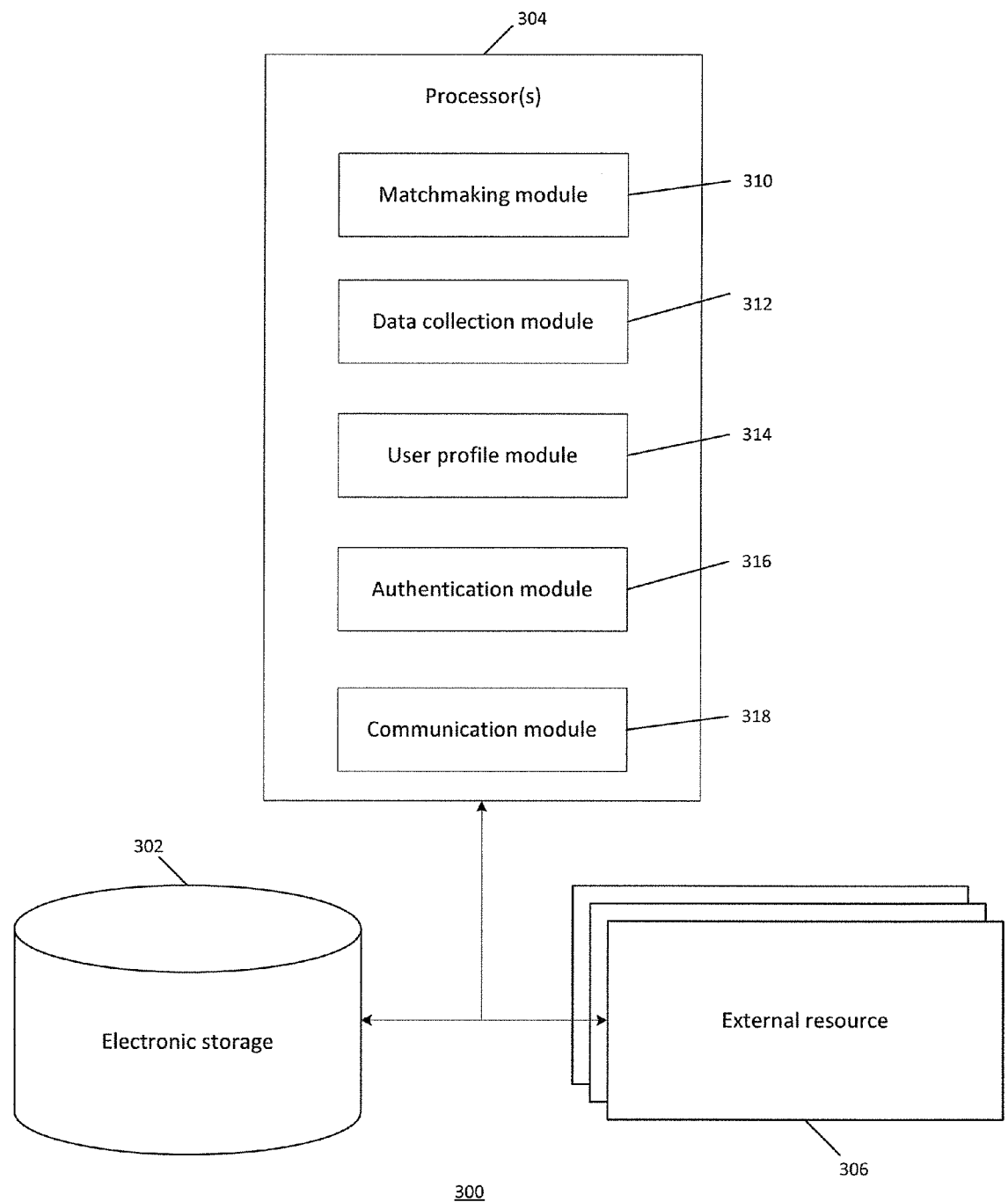
FIG. 3 is a block diagram of a server useful in accordance with aspects of the invention.

FIG. 3 is an example of a block diagram of a matchmaking server 300 useful in accordance with aspects of the invention. The matchmaking server is coupled to a network (not explicitly shown), for example the internet. In some implementations, matchmaking server 300 may comprise one or more of electronic storage 302, processor(s) 304, external resources 306, and/or other components. The various components of matchmaking server 300 may be configured for electronic communication among one another. Such communication may be accomplished via one or more networks, one or more direct connections, one or more wireless connections, one or more wired connections, and/or other electronic communication media. Matchmaking server 300 may be in communication with user computers and other client computing platforms.

Processor(s) 304 may be configured to provide information processing capabilities within matchmaking server 300. For example, processor(s) 304 may configured to execute computer program modules that may include one or more of a matchmaking module 310, a data collection module 312, a user profile module 314, an authentication module 316, a communication module 318, and/or other modules. In various embodiments, these modules may perform various operations as further discussed herein. In some embodiments, the matchmaking module performs operations relating to matching user game systems with host game systems for multiplayer video gaming sessions. In some embodiments, the data collection module performs operations relating to collection of information regarding potential host systems, and network connection quality indicators between the potential host systems and other potential host systems and/or other game systems. In some embodiments, the user profile module receives and/or determines user information, for example user skill levels, game system game capabilities, preferred game characteristics, and other user related information. In some embodiments, the authentication module performs operations relating to authentication of users and potential hosts. In some embodiments, the communications module performs operations relating to communication with storage and/or external resources, as well as communicating over a network, for example the Internet.

In some implementations, electronic storage 302 may include information about available games, user profile data, data collected from previous gameplay and matchmaking sessions, and/or other data. In some implementations, electronic storage 302 may comprise non-transitory electronic storage media that electronically stores information. Electronic storage 302 may include one or both of system storage that is provided integrally (e.g., substantially non-removable) with matchmaking server 300 and/or removable storage that is removably connectable to matchmaking server 300 via, for example, a port (e.g., a USB port, a firewire port, etc.) or a drive (e.g., a disk drive, etc.). Electronic storage 302 may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. Electronic storage 302 may include virtual storage resources, such as storage resources provided via a cloud and/or a virtual private network. Electronic storage 302 may store software algorithms, information determined by processor 304, information received via client computing platforms 308, and/or other information that enables matchmaking server 300 to function properly. Electronic storage 302 may be a separate component within matchmaking server 300, or electronic storage 302 may be provided integrally with one or more other components of matchmaking server 300. For example, in certain implementations, the non-transitory electronic storage media of electronic storage 302 may include a cache (e.g., L1 cache, L2 cache, etc.) of processor 304.

In some implementations, electronic storage 302, processor(s) 304, external resources 306, and/or other components (e.g., additional instances of matchmaking server system 100) may be operatively linked via one or more electronic communication links. For example, such electronic communication links may be established, at least in part, via a network such as the internet and/or other networks. It will be appreciated that this is not intended to be limiting, and that the scope of this disclosure includes implementations in which electronic storage 302, processor(s) 304, external resources 306, and/or other components may be operatively linked via some other communication media.

In some implementations, the external resources 306 may include services and sources of information external to matchmaking server 300, for example, autonomous system number lookup services, geo-location lookup services, WHOIS services, or lists of available games external to matchmaking server 300. In some implementations, some or all of the functionality attributed herein to external resources 306 may be provided by resources included in matchmaking server 300.

In some implementations, processor(s) 304 may include one or more of a digital processor, an analog processor, a digital circuit designed to process information, an analog circuit designed to process information, a state machine, and/or other mechanisms for electronically processing information. Although processor(s) 304 is shown in FIG. 3 as a single entity, this is for illustrative purposes only. In some implementations, processor(s) 304 may include a plurality of processing units. These processing units may be physically located within the same device, or processor(s) 304 may represent processing functionality of a plurality of distributed devices operating in coordination.

Processor(s) 304 may be configured to execute matchmaking module 310, data collection module 312, user profile module 314, authentication module 316, communication module 318, and/or other modules. Processor(s) 304 may be configured to execute modules 310, 312, 314, 316, 318, and/or other modules by software; hardware; firmware; some combination of software, hardware, and/or firmware; and/or other mechanisms for configuring processing capabilities on processor(s) 304.

It should be appreciated that although modules 310, 312, 314, 316, and 318 are illustrated in FIG. 3 as being co-located within a single processing unit, in implementations in which processor(s) 304 includes multiple processing units, one or more of modules 310, 312, 314, 316, and 318 may be located remotely from the other modules. The description of the functionality provided by the different modules 310, 312, 314, 316, and 318 provided below is for illustrative purposes, and is not intended to be limiting, as any of modules 310, 312, 314, 316, and 318 may provide more or less functionality than is described. For example, one or more of modules 310, 312, 314, 316, and 318 may be eliminated, and some or all of its functionality may be provided by other ones of modules 310, 312, 314, 316, and 318. As another example, processor 304 may be configured to execute one or more additional modules that may perform some or all of the functionality attributed below to one of modules 310, 312, 314, 316, and 318.

Figure 4:
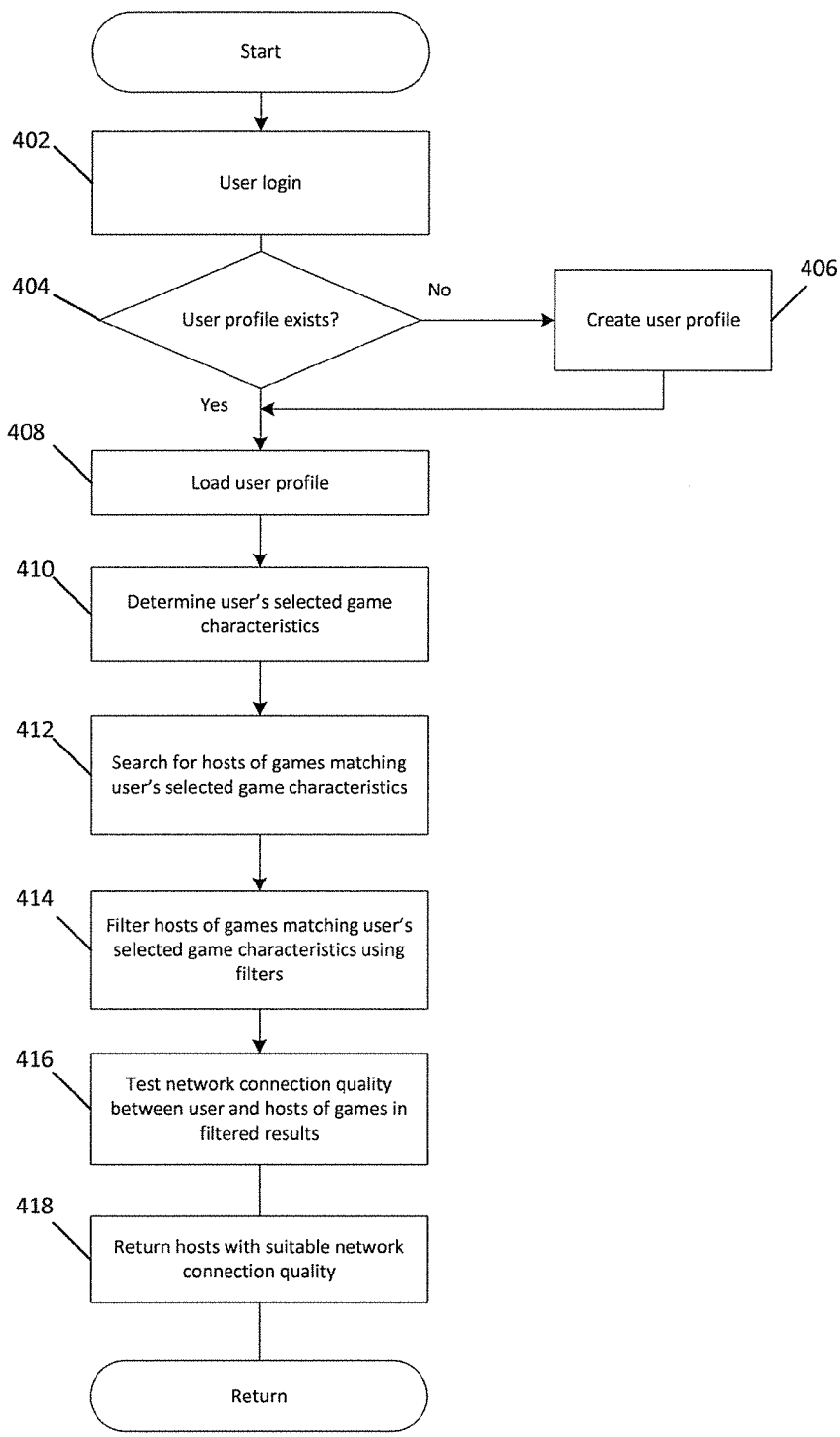
FIG. 4 is a flow chart of an illustrative process for online multiplayer matchmaking in accordance with aspects of the present invention.

FIG. 4 shows a flow chart of an illustrative process for online multiplayer matchmaking in accordance with aspects of the present invention. The process may be performed by a matchmaking server as described in connection with FIGS. 1 and 3.

At block 402, a user logs into a matchmaking server. There are a number of different ways in which a user may connect to the matchmaking server, including by connecting via a high-speed internet connection, dial-up connection, or any other suitable connection. In some embodiments, the user may be required to have a valid account with the matchmaking server. In some embodiments, the matchmaking service may prompt the user to input a valid username and password. Additionally, the matchmaking service may provide the option of anonymous play or guest login, where authentication is not required. The login process may be performed, for example, by an authentication module of the matchmaking server.

In block 404, the process determines if a user profile exists for the user. In some embodiments, the matchmaking service may maintain profiles for users of the matchmaking server, for example, using a user profile module. A user profile can comprise any set of information associated with a user. For example, the profile may contain the user's computing capabilities (e.g., processor speed, storage capacity, connection bandwidth, etc.), skill level, game preferences, login patterns/history, and/or personal information (e.g., location, age, gender, etc.). If a profile is found to exist for the user, the process proceeds to block 408. Otherwise, the process proceeds to block 406, where a user profile is created for the user. After the user profile is created for the user in block 406, the process proceeds to block 408, where the process loads the user's profile.

In block 410, the process determines the user's selected game characteristics. In some embodiments, the game characteristics may include game mode or game type, level or map difficulty, maximum or minimum skill or experience level of other players, preferred game maps, preferred playing partners, gameplay rules, and/or any other characteristics of the desired game. In some embodiments, the user's preferred game characteristics may be saved in the user's user profile, and automatically loaded as default selections.

In some embodiments, the user may select from one or more playlists, which reflect predefined configurations of game characteristics. For example, in a first-person shooter game, playlists may be based on the game mode or game type, and may, for example, include Team Deathmatch (multiple teams competing to vanquish the most opposing teams' members or be the first to vanquish a certain number of opposing teams' members), Capture the Flag (multiple teams competing to capture the opposing teams' flag(s)), Free for All (individual players competing to vanquish the most opponents or be the first to vanquish a certain number of opponents), Kill Confirmed (multiple teams competing to earn points by vanquishing and collecting items from opposing teams' members), and Search & Destroy (multiple teams take turns attempting to achieve a certain objective, for example, deploying a bomb in the other team's base). Of course, these examples of playlists are merely exemplary, and any number of game characteristics can be used to craft a playlist. For example, a playlist may comprise games in which only small maps are used, or games in which only novice players may join. In some embodiments, the user may define his or her own playlists.

In block 412, the process searches for hosts of games matching the user's selected game characteristics. As discussed above, in some embodiments, the games may be hosted centrally by one or more dedicated game servers, which may or may not be part of the matchmaking server. Additionally or alternatively, in some embodiments, the games may be hosted by users. In any case, the matchmaking server maintains a database of all hosted games and their characteristics. The matchmaking server then queries the database to obtain a list of hosts of games matching the user's selected game characteristics. The process then proceeds to block 414.

In block 414, the process filters the hosts of games matching the user's selected game characteristics (returned in block 412) using predefined filters to reduce the number of hosts. In some embodiments, block 414 may be performed as part of block 412. In some embodiments, the filters are based on characteristics of the multiplayer video game to be hosted, characteristics of the players for the multiplayer video game, and/or an internet distance between the user's computer and a host's computer. In some embodiments, internet distance is based on the network conditions and/or the quality of service of communications between computers in the user's autonomous system and computers in the host's autonomous system (e.g., latency, packet loss, jitter (or packet delay variation), availability, etc.). In some embodiments, the network conditions and/or quality of service of communications between computers in the user's autonomous system and computers in the host's autonomous system are continuously collected and updated as part of this process, as discussed below in block 416. Additionally or alternatively, internet distance may be determined by the number of hops between computers in the user's autonomous systems and computers in the host's autonomous system. Additionally or alternatively, internet distance may be determined by whether the user's computer shares an autonomous system with the host. In some embodiments internet distance is based on autonomous system distance between game player systems and the host, and in some embodiments internet distance is based on autonomous system numbers. In some embodiments, the predefined filters include a filter based on internet distance between a user and a host and one, some, or all of filters based on skill level of the user, games that allow new users to join, games that have particular aspects requested by or available to the user, or filters based on other criteria. The details of an example filtering process are discussed below in connection with FIG. 5. The process then proceeds to block 416.

In block 416, the process tests the network connection quality between the user and the hosts remaining after the filtering process. In some embodiments, testing the network connection quality may comprise one or more of determining the round trip time of sending data between the user and the host, determining the connection bandwidth and/or throughput between the user and the host, determining the ratio of sent packets to dropped packets between the user and the host, determining the jitter of packets sent between the user and host, determining the availability of the host, or any other indicators of the quality of service and network connection quality between the user and the host. In some embodiments, the process logs the results of the quality of service and network connection quality tests to provide a continuously updating table or graph showing empirical network conditions and/or quality of service data collected for communications between various computers. In some embodiments, the table or map may be used to determine historical or average network conditions and/or quality of service metrics between a plurality of computers in different autonomous systems. The table or graph may be used in future matchmaking sessions as discussed in block 414, above. The process then proceeds to block 418.

In block 418, the process returns a set of hosts with suitable network connection quality to the user. The criteria for determining whether a host has a suitable connection to the user may depend on the metric used to determine network connection quality in block 416. For example, if the network connection quality between the user and the host was determined in block 416 by observing the round trip time for sending data between the user and the host, then any host that has an observed round trip time less than a threshold amount (e.g., 200 ms or 300 ms) may be deemed to have a suitable connection to the user.

Figure 5:
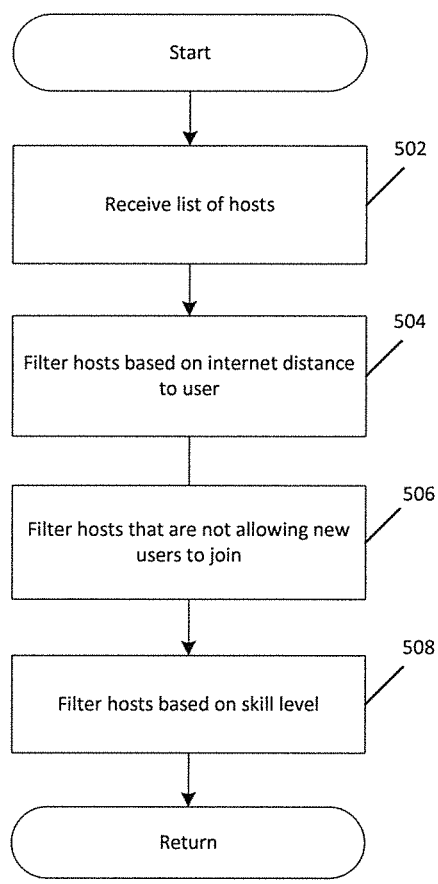
FIG. 5 is a flow chart of an illustrative process for filtering hosts of online multiplayer games in accordance with aspects of the present invention.

FIG. 5 shows a flow chart of an illustrative process for filtering hosts of online multiplayer games in accordance with aspects of the present invention. The process may be performed by the matchmaking servers described in connection with FIGS. 1 and 3. The process may also be performed in conjunction with the process described in connection with FIG. 4.

At block 502, the process begins by receiving a list of hosts of an online multiplayer game and information associated with the hosts. In some embodiments, the information associated with the hosts includes information from which an autonomous system of the host may be derived or determined, characteristics of a user of the host, and characteristics of a video game to be hosted. In many embodiments, the hosts may be running games, or be available and/or ready to run games, that match the selected game characteristics of a user seeking to join an online multiplayer game. The process then proceeds to block 504.

In block 504, the process filters and sorts the received list based on the internet distance between the user and hosts in the list. Generally, the internet distance between a user and a host may be a measurement of the number of hops or transit path length between the user and the host. The internet distance between a user and a host may be determined in a number of ways. In one embodiment, the internet distance may be a function of the number of autonomous systems that a communication from the user must traverse to reach the host. As used herein, the term autonomous system refers to a connected group of one or more internet protocol prefixes run by one or more network operators which, from the perspective of external agents, appears to have a single routing policy. Autonomous systems (also referred to as routing domain identifiers) are used as the unit of routing policies in exterior routing protocols, and are applicable to protocols including EGP (Exterior Gateway Protoocol), BGP (Border Gateway Protocol), and IDRP (OSI Inter-Domain Routing Protocol).

Figure 6:
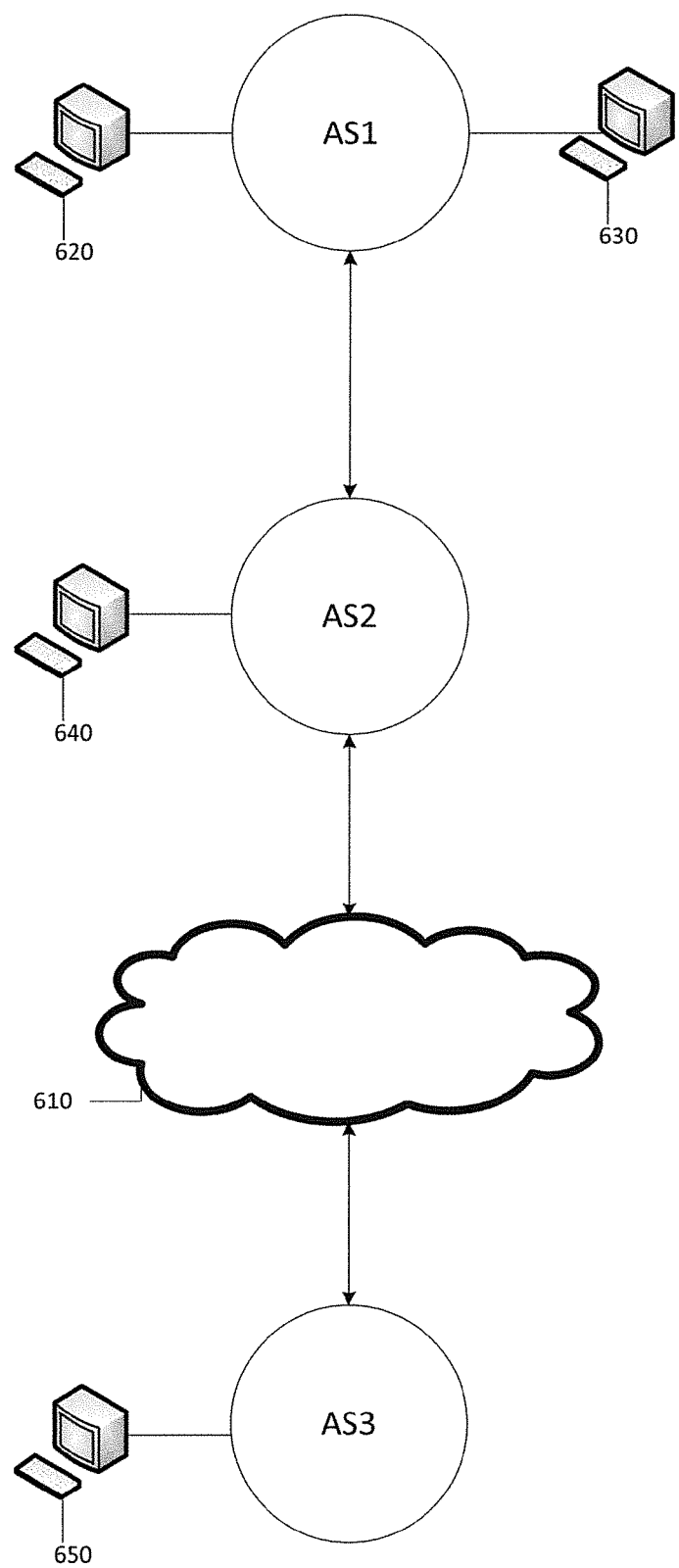
FIG. 6 is block diagram of a network in accordance with aspects of the present invention.

FIG. 6 depicts an example of a network of user computers 620-650 located in autonomous systems AS1-AS3. In the example of FIG. 6, user computer 620 and user computer 630 are both located in AS1, and thus may be considered the closet in terms of internet distance. On the other hand, a communication packet from user computer 620 in AS1 to user computer 640 in neighboring autonomous system AS2 must traverse inter-domain routers connecting AS1 to AS2. Communication from user computer 620 in AS1 to user computer 650 in AS3 are farther still, as they must traverse AS2 and any other autonomous systems in communication network 610 connecting AS1 to AS3.

Referring back to the filtering process described in FIG. 5, in block 504, the process filters the received list of hosts based on the internet distance between the user and hosts. In some embodiments, the process may determine the autonomous system for the user and each host, for example, by using WHOIS services, autonomous system number lookup services, and/or examining BGP routing tables. The process may then determine the hosts that share the same autonomous system as the user. In some embodiments, if the number of hosts that share the same autonomous system as the user does not meet or exceed a certain threshold, the process may additionally determine the hosts that are in neighboring autonomous systems or that are in autonomous systems that can be reached within a certain number of inter-domain hops.

In some embodiments, the process may collect quality of service statistics between users in various autonomous systems and use those statistics as a predictor of internet distance. For example, Table 1, below, shows the average round trip times for packets sent from users located in AS1 to users located in AS1, AS2, and AS3:

TABLE 1

| Average RTT For Packets Sent From AS1 | | |
|---|---|---|
| AS1 | AS2 | AS3 |
| 50 ms | 100 ms | 1000 ms |

The process may determine that, for a given game, an average round trip time greater than 200 ms would be undesirable. Hence, using the statistical data observed in Table 1, the process would determine that users in AS1 may be successfully matched with hosts in AS1 and AS2, but would be too remote from the hosts in AS3. Any quality of service metrics can be used including: latency, packet loss, jitter, availability, etc.

In block 506, the process filters the returned list for games that are currently allowing users to join. The process then proceeds to block 508.

In block 508, the process filters the returned games based on skill level (e.g., only return games hosted by similarly skilled players or games allowing similarly skilled players). For example, in some embodiments, skill level of players may be indicated in a numeric manner, and only players within a predefined range of skill values may be allowed to join. In some embodiments, a skill level of a user of the host system is also considered in this regard. The process then returns.

Although the invention has been discussed with respect to various embodiments, it should be recognized that the invention comprises the novel and non-obvious claims supported by this disclosure. For example, while certain embodiments discussed herein have been in the context of multiplayer matchmaking in online video games, one of ordinary skill will appreciate that aspects of the invention may be applied to embodiments outside the gaming context. In particular, the use of internet distance metrics (e.g., the quality of service between computers in different autonomous systems, the number of hops between computers, etc.) as a filter or predictor of network connection quality is useful in any network-based application that attempts to match or pair a user with one of a plurality of potential hosts, servers, and/or peers. As just one example, a media streaming system may have many potential servers capable of streaming a piece of content to a user. In selecting the optimal server to be paired with the user, the system may filter the potential servers based on the internet distance between the user and potential servers, as described in the above embodiments. As another example, peer-to-peer file sharing systems may use the internet distance between the user and potential peers to select suitable network connections.

Figure 7:
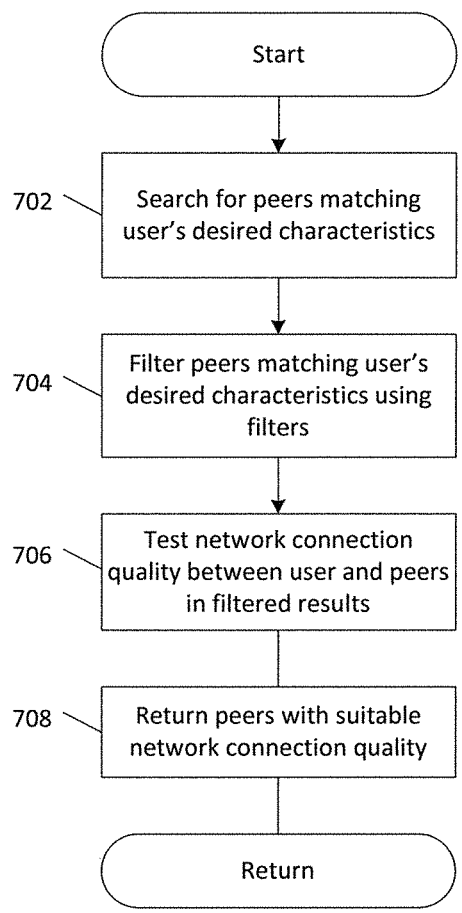
FIG. 7 is a flow chart of an illustrative process for a user computer selecting a peer for networked communications in accordance with aspects of the present invention.

FIG. 7 shows a flow chart of an illustrative process for a user computer selecting a peer (or sever, host, etc.) for networked communications in accordance with aspects of the present invention. The process may be performed, for example, by a system in which a user computer determines a peer with suitable network connection quality from a plurality of candidates.

In block 702, the process searches for peers matching the user's desired characteristics. The desired characteristics vary from system to system. For example, in file sharing systems, the desired characteristics may include whether a peer is sharing a desired media file. As another example, in a content delivery system, the desired characteristics may include whether a server is streaming the desired content. The process then proceeds to block 704.

In block 704, the process filters the peers matching the user's desired characteristics (returned in block 702) using predefined filters to reduce the number of peers. The filtering process is generally similar to the filtering process described in connection with FIGS. 4 and 5, and in some embodiments, block 704 may be performed as part of block 702. In some embodiments, the filters are based on an internet distance between the user's computer and a peer's computer. In some embodiments, internet distance is based on the network conditions and/or the quality of service of communications between computers in the user's autonomous system and computers in the peer's autonomous system (e.g., latency, packet loss, jitter (or packet delay variation), availability, etc.). In some embodiments, the network conditions and/or quality of service of communications between computers in the user's autonomous system and computers in the peer's autonomous system are continuously collected and updated as part of this process, as discussed below in block 706. Additionally or alternatively, internet distance may be determined by the number of hops between computers in the user's autonomous systems and computers in the peer's autonomous system. Additionally or alternatively, internet distance may be determined by whether the user's computer shares an autonomous system with the peer.

In block 706, the process tests the network connection quality between the user and the peers remaining after the filtering process. In some embodiments, testing the network connection quality may comprise one or more of determining the round trip time of sending data between the user and the peer, determining the connection bandwidth and/or throughput between the user and the peer, determining the ratio of sent packets to dropped packets between the user and the peer, determining the jitter of packets sent between the user and peer, determining the availability of the peer, or any other indicators of the quality of service and network connection quality between the user and the peer. In some embodiments, the process logs the results of the quality of service and network connection quality tests to provide a dynamically updating table or graph showing empirical quality of service data collected between various computers. In some embodiments, the table or graph may be used to determine historical or average network conditions and/or quality of service metrics between a plurality of computers in different autonomous systems. The table or graph may be used in future matchmaking sessions as discussed in block 704, above. The process then proceeds to block 708.

In block 708, the process returns a set of peers with suitable network connection quality to the user. The criteria for determining whether a peer has a suitable connection to the user may depend on the metric used to determine network connection quality in block 706. For example, if the network connection quality between the user and the peer was determined in block 706 by observing the round trip time for sending data between the user and the host, then any peer that has an observed round trip time less than a threshold amount (e.g., 200 ms or 300 ms) may be deemed to have a suitable connection to the user. One skilled in the art will appreciate that although specific examples and embodiments of the system and methods have been described for purposes of illustration, various modifications can be made without deviating from the present invention. For example, embodiments of the present invention may be applied to many different types of databases, systems and application programs. Moreover, features of one embodiment may be incorporated into other embodiments, even where those features are not described together in a single embodiment within the present document. Furthermore, all or portions of the subject innovation can be implemented as a system, method, apparatus, or article of manufacture using standard programming and/or engineering techniques to produce software, firmware, hardware or any combination thereof to control a computer to implement the disclosed innovation.

What is claimed is:

1. A computer implemented method for determining a plurality of potential hosts for a multiplayer video gaming session, comprising:
    receiving, over a network, an indication from a plurality of first game systems that the first game systems are available as hosts for a multiplayer video gaming session, along with, for each of the plurality of first game systems, a plurality of game characteristics for the multiplayer video gaming session, the plurality of game characteristics including characteristics of a video game for the multiplayer video gaming session and at least one characteristic, represented by a numerical value, associated with a user of the first game system;
    receiving, over the network, a request from a second game system for available multiplayer video gaming sessions, the request including at least one characteristic of a requested video game for the multiplayer video gaming session and at least one characteristic, represented by a numerical value, associated with a user of the second game system;
    determining potential multiplayer video gaming session hosts, by determining which of the first game systems available as a host have characteristics of the video game the same as the at least one characteristic of the requested video game for the multiplayer video gaming session, have the characteristic associated with the user of the game system within a predefined numerical range of the characteristic of the user of the second game system, and which are in a predefined set of autonomous systems;
    transmitting a request to the second game system to test a network connection quality between the second game system and at least some of the first game systems determined to be potential multiplayer video gaming session hosts;
    receiving an indication from the second game system of the network connection quality between the second game system and the at least some of the first game systems determined to be potential multiplayer video gaming session hosts;
    selecting as possible multiplayer video gaming session hosts those first game systems having a network connection quality with the second game system better than a predefined network connection quality; and
    transmitting, to the second game system, information of the first game systems which are possible multiplayer video gaming session hosts.

2. The method of claim 1, wherein the characteristic associated with the user of the first game system available as a host is a skill level of the user of the first game system available as a host.

3. The method of claim 1, wherein the characteristic associated with the user of the second game system is a skill level of the user of the second game system.

4. The method of claim 1, wherein the predefined set of autonomous systems is the same autonomous system.

5. The method of claim 1, wherein the predefined set of autonomous systems is a set of autonomous systems not separated from an autonomous system of the second game by another autonomous system.

6. The method of claim 1, wherein the predefined set of autonomous systems is a predefined range of autonomous systems defined in terms of Internet distance.

7. The method of claim 1, wherein the predefined set of autonomous systems is a predefined range of autonomous systems defined in terms of autonomous system numbers.

8. A method for online multiplayer matchmaking comprising:
    determining at least one selected game characteristic;
    determining at least one host of a game matching the selected game characteristic; and
    determining an autonomous system of a user and determining an autonomous system of the host;
    determining an internet distance between the user and the host;
    wherein determining the internet distance between the user and the host includes determining a number of autonomous systems between the autonomous system of the user and the autonomous system of the host.

9. The method of claim 8, wherein determining the internet distance between the user and the host comprises determining whether the autonomous system of the user is the same as the autonomous system of the host.

10. The method of claim 8, wherein determining the internet distance between the user and the host comprises determining whether the autonomous system of the user and the autonomous system of the host are autonomous systems which are not separated by another autonomous system.

11. The method of claim 8, wherein determining the internet distance between the user and the host further comprises determining a quality of service metric for data sent between a plurality of computers in the autonomous system of the user and a plurality of computers in the autonomous system of the host, wherein the quality of service metric is determined by one or more of: latency for packets sent between a plurality of computers in the two autonomous systems, network jitter (or packet delay variation) for packets sent between a plurality of computers in the two autonomous systems, rate of packet loss for packets sent between a plurality of computers in the two autonomous systems, and the availability of a plurality computers in the autonomous system of the user and the autonomous system of the host.

12. The method of claim 8, wherein determining the number of autonomous systems between the autonomous system of the user and the autonomous system of the host comprises determining the number of autonomous systems that must be traversed to send a packet from the autonomous system of the user to the autonomous system of the host.

13. A system for performing matchmaking for multiplayer video game play, comprising:
   a server system coupled to the Internet, the server system including one or more processors configured by program instructions to execute at least a matchmaking module and a data collection module;
   electronic storage storing information regarding video games available for multiplayer game play and user profile information, the user profile information including an indication of skill of users and game characteristics of the users;
   the data collection module including program instructions to determine an indication of internet distance between game machines of users and potential multiplayer video game host machines, the indication of internet distance being based on autonomous system information of the game machines of the users and autonomous system information of the potential multiplayer video game host machines and network latency statistics between the game machines of users and potential multiplayer video game host machines;
   the matchmaking module including program instructions to match game machines of the users with potential multiplayer video game host machines based on the indication of skill of the users, the game characteristics of the users, and the indication of internet distance between the game machines of users and the potential multiplayer video game host machines.

* * * * *